United States Patent [19]

Jahelka et al.

[11] 4,158,800
[45] Jun. 19, 1979

[54] CONTROL SYSTEM

[75] Inventors: James R. Jahelka, Wichita; Edward D. Bemis, Derby, both of Kans.

[73] Assignee: NCR Corporation, Dayton, Ohio

[21] Appl. No.: 735,722

[22] Filed: Oct. 26, 1976

[51] Int. Cl.[2] ............................................. G05B 19/40
[52] U.S. Cl. .................................. 318/685; 318/696; 318/640; 318/313
[58] Field of Search ............... 318/685, 696, 640, 254, 318/138, 313

[56] References Cited

U.S. PATENT DOCUMENTS

| | | | |
|---|---|---|---|
| 3,736,488 | 5/1973 | Abraham et al. | 318/696 |
| 3,843,917 | 10/1974 | Hoffman | 318/696 |
| 3,863,118 | 1/1975 | Lander et al. | 318/685 |
| 3,869,656 | 3/1975 | Kennedy et al. | 318/696 |
| 3,946,298 | 3/1976 | van de Loo | 318/696 |

*Primary Examiner*—Gene Z. Rubinson
*Assistant Examiner*—Eugene S. Indyk
*Attorney, Agent, or Firm*—J. T. Cavender; Albert L. Sessler, Jr.

[57] ABSTRACT

Improved drive logic for a stepper motor is provided using a closed loop feedback system which includes a coded disk driven by the motor and decoding means to derive signals from said disk. The motor is operated at varying speeds in accordance with variations in the lead angle between the energized motor windings and the motor shaft position. Motor drive signals are generated in response to the sensing of leading or trailing edge pulses from the coded disk, and the lead angle, and thus the speed of the motor, may be increased or decreased by selectively shifting the control of the drive signals from a pulse leading edge to a pulse trailing edge or vice versa, thereby providing a change in the lead angle. In addition, pulses from the coded disk may be blanked in order to effect a decrease in motor speed.

26 Claims, 19 Drawing Figures

| FIG. 4A | FIG. 4B |
| --- | --- |
| FIG. 4C | FIG. 4D |
| FIG. 4E | FIG. 4F |

FIG. 3A

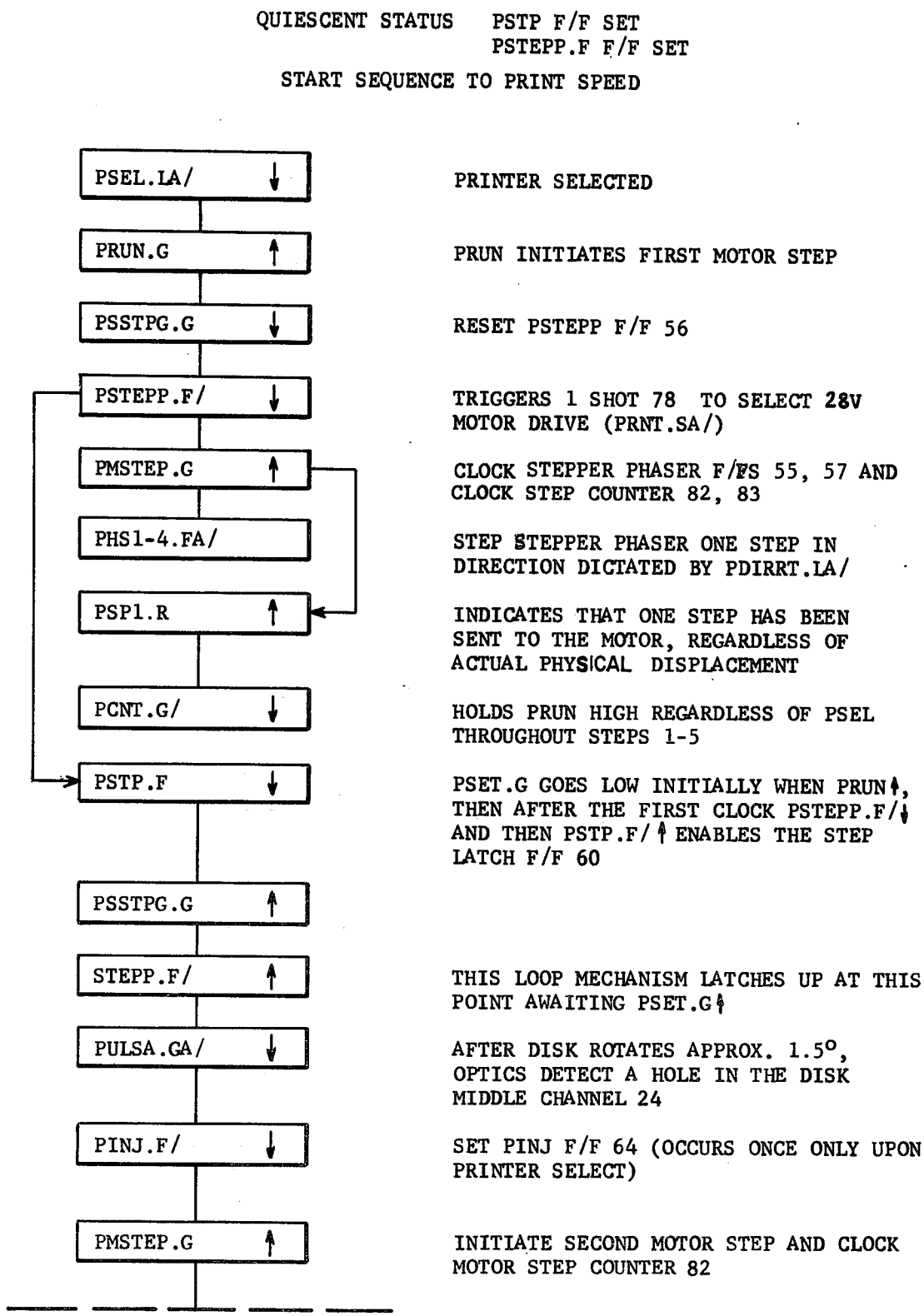

QUIESCENT STATUS   PSTP F/F SET
                   PSTEPP.F F/F SET
START SEQUENCE TO PRINT SPEED

- PSEL.LA/ ↓ — PRINTER SELECTED
- PRUN.G ↑ — PRUN INITIATES FIRST MOTOR STEP
- PSSTPG.G ↓ — RESET PSTEPP F/F 56
- PSTEPP.F/ ↓ — TRIGGERS 1 SHOT 78 TO SELECT 28V MOTOR DRIVE (PRNT.SA/)
- PMSTEP.G ↑ — CLOCK STEPPER PHASER F/FS 55, 57 AND CLOCK STEP COUNTER 82, 83
- PHS1-4.FA/ — STEP STEPPER PHASER ONE STEP IN DIRECTION DICTATED BY PDIRRT.LA/
- PSP1.R ↑ — INDICATES THAT ONE STEP HAS BEEN SENT TO THE MOTOR, REGARDLESS OF ACTUAL PHYSICAL DISPLACEMENT
- PCNT.G/ ↓ — HOLDS PRUN HIGH REGARDLESS OF PSEL THROUGHOUT STEPS 1-5
- PSTP.F ↓ — PSET.G GOES LOW INITIALLY WHEN PRUN↑, THEN AFTER THE FIRST CLOCK PSTEPP.F/↓ AND THEN PSTP.F/↑ ENABLES THE STEP LATCH F/F 60
- PSSTPG.G ↑
- STEPP.F/ ↑ — THIS LOOP MECHANISM LATCHES UP AT THIS POINT AWAITING PSET.G↑
- PULSA.GA/ ↓ — AFTER DISK ROTATES APPROX. 1.5°, OPTICS DETECT A HOLE IN THE DISK MIDDLE CHANNEL 24
- PINJ.F/ ↓ — SET PINJ F/F 64 (OCCURS ONCE ONLY UPON PRINTER SELECT)
- PMSTEP.G ↑ — INITIATE SECOND MOTOR STEP AND CLOCK MOTOR STEP COUNTER 82

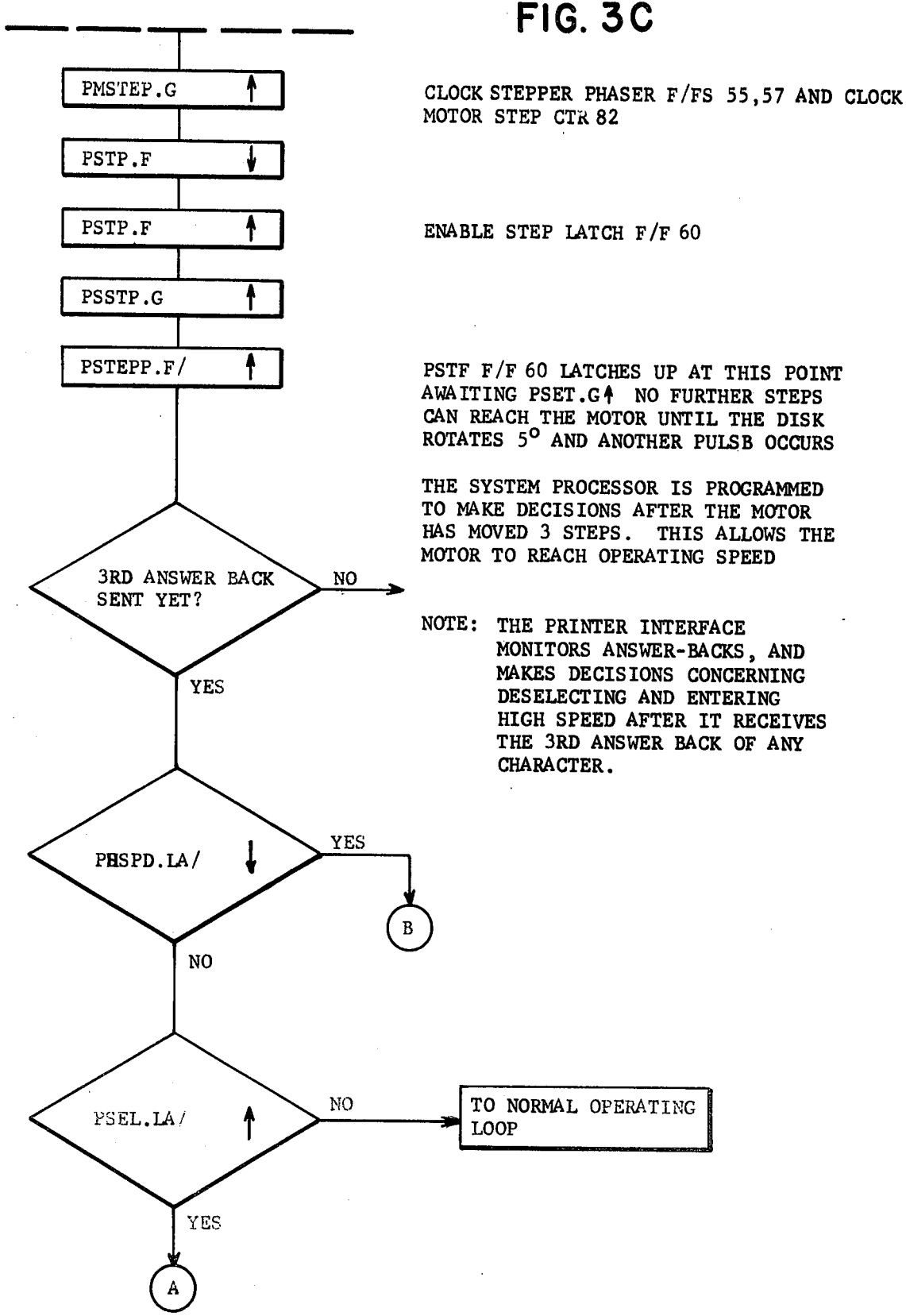

FIG. 3D

STATUS    The third answer-back has been sent and the Stepper motor has taken or is about to take step 5 and the interface has raised PSEL.LA/ so the motor will be stopped within the present character.

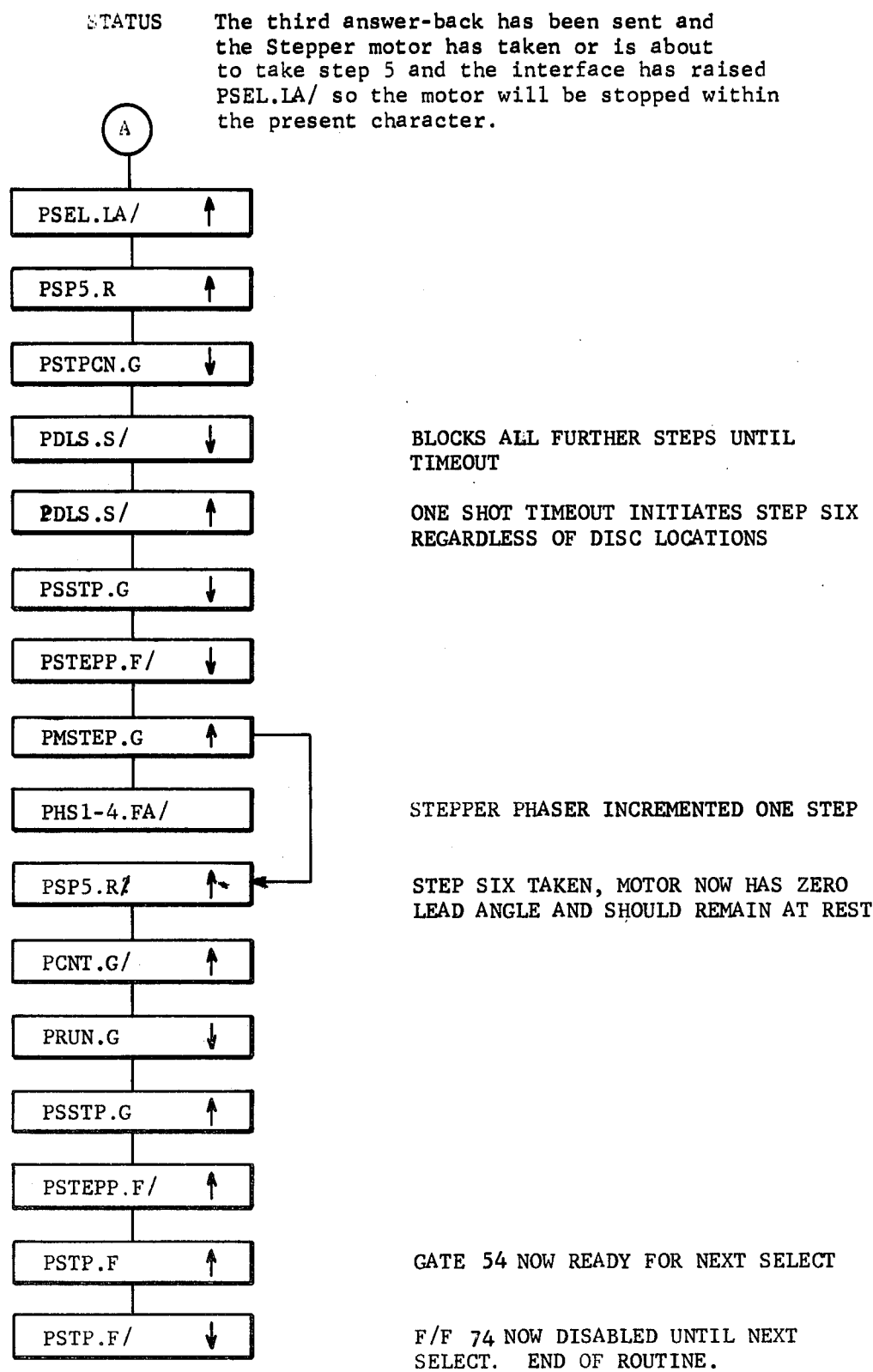

BLOCKS ALL FURTHER STEPS UNTIL TIMEOUT

ONE SHOT TIMEOUT INITIATES STEP SIX REGARDLESS OF DISC LOCATIONS

STEPPER PHASER INCREMENTED ONE STEP

STEP SIX TAKEN, MOTOR NOW HAS ZERO LEAD ANGLE AND SHOULD REMAIN AT REST

GATE 54 NOW READY FOR NEXT SELECT

F/F 74 NOW DISABLED UNTIL NEXT SELECT. END OF ROUTINE.

FIG. 3E

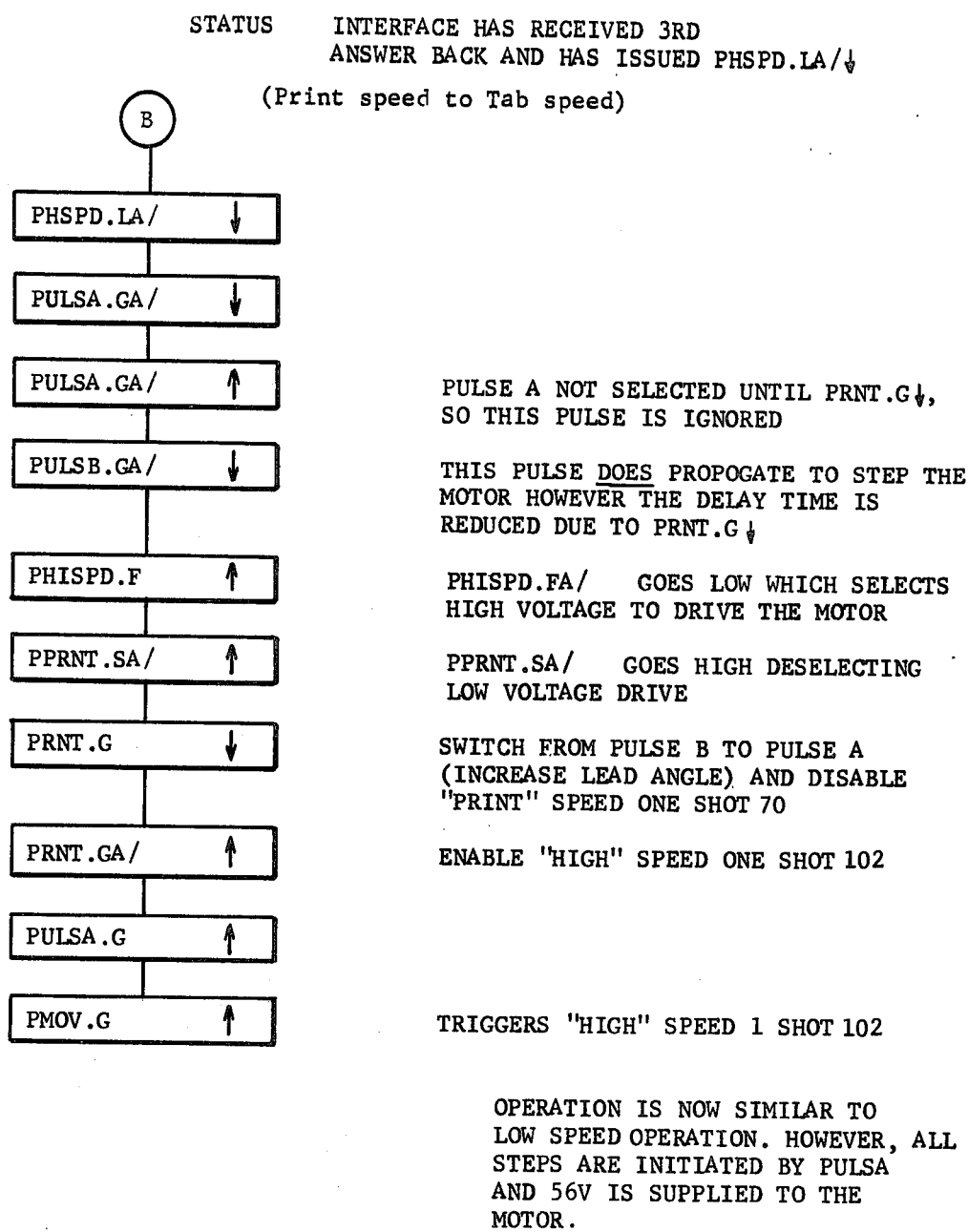

STATUS  INTERFACE HAS RECEIVED 3RD ANSWER BACK AND HAS ISSUED PHSPD.LA/↓

(Print speed to Tab speed)

PULSE A NOT SELECTED UNTIL PRNT.G↓, SO THIS PULSE IS IGNORED

THIS PULSE <u>DOES</u> PROPOGATE TO STEP THE MOTOR HOWEVER THE DELAY TIME IS REDUCED DUE TO PRNT.G↓

PHISPD.FA/  GOES LOW WHICH SELECTS HIGH VOLTAGE TO DRIVE THE MOTOR

PPRNT.SA/  GOES HIGH DESELECTING LOW VOLTAGE DRIVE

SWITCH FROM PULSE B TO PULSE A (INCREASE LEAD ANGLE) AND DISABLE "PRINT" SPEED ONE SHOT 70

ENABLE "HIGH" SPEED ONE SHOT 102

TRIGGERS "HIGH" SPEED 1 SHOT 102

OPERATION IS NOW SIMILAR TO LOW SPEED OPERATION. HOWEVER, ALL STEPS ARE INITIATED BY PULSA AND 56V IS SUPPLIED TO THE MOTOR.

SWITCH BACK TO PULSE B AND PRINT-
SPEED 1 SHOT 70

PRINT SPEED OPERATION
CONTINUES NOW WITH PULSE
B ORIGINATING ALL STEPS,
28V SUPPLIED BY THE DRIVER

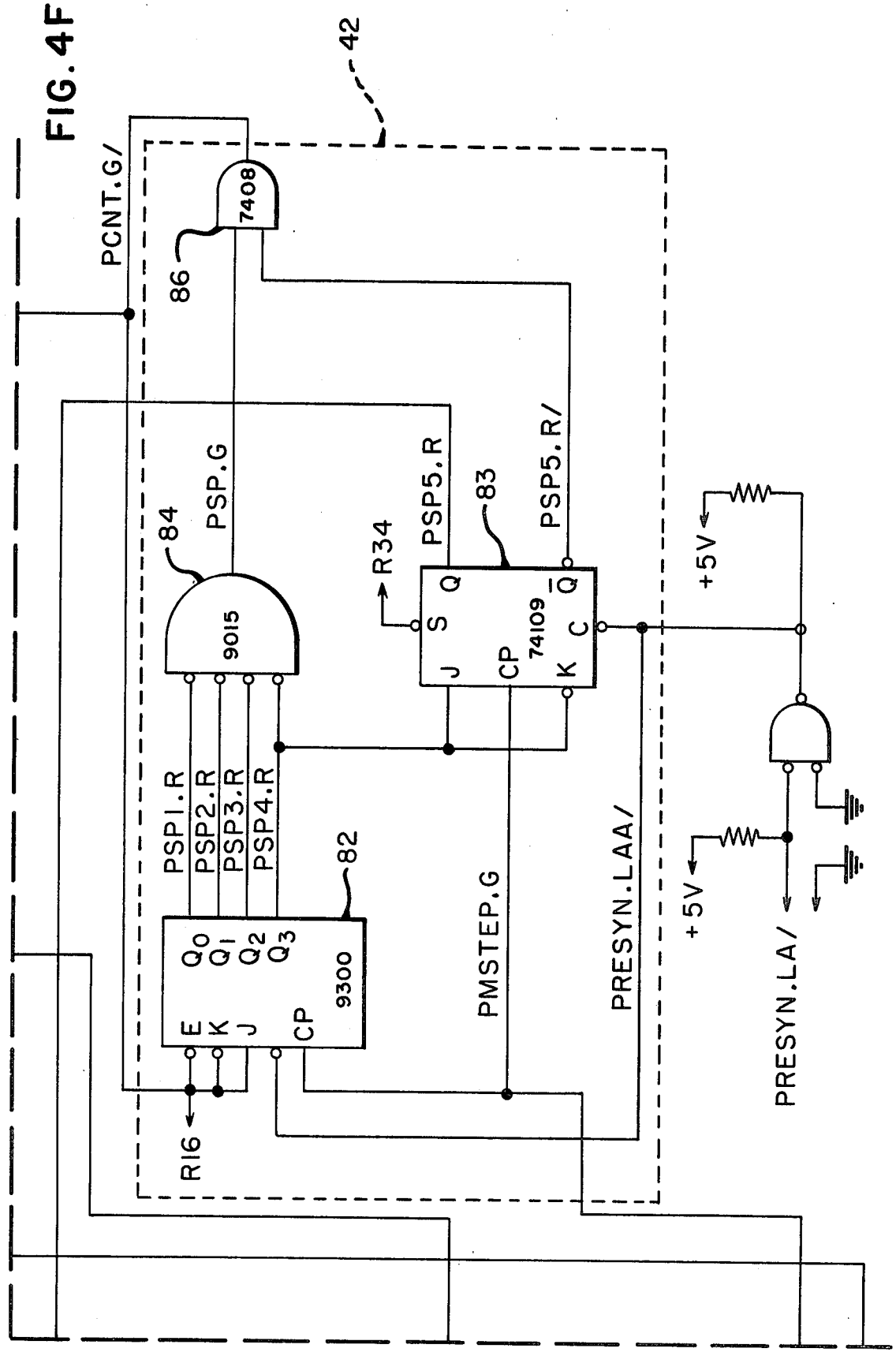

CONTROL SYSTEM

BACKGROUND OF THE INVENTION

1. Field of the Invention

The present invention relates generally to control systems for stepping motors, and more particularly relates to a closed-loop control system embodying an encoded disk driven by said motor, and having associated sensing and control means for generating signals used in providing motor drive signals, and in controlling the speed of said motor.

2. Description of the Prior Art

Stepping motors are used in many applications for a wide variety of purposes. In data processing systems, one use for stepping motors is to provide motive power for serial printing units. The stepping motor should be capable of operating at as high a rate as possible, and of tabulating or slewing at a higher rate between characters being printed. In obtaining the highest possible printing and slewing speeds, it is also important that a high degree of stability and reliability of design, as well as resistance to stalling, be maintained. These attributes are provided by the novel design of the present invention.

SUMMARY OF THE INVENTION

The present invention is directed to a stepper motor drive system and more particularly to the motor drive logic utilized in a system for controlling a stepper motor.

The stepper motor drive logic of the present invention is controlled by three signals: the direction signal, the select signal and the speed signal. The direction of movement of the stepper motor is determined by the direction signal which causes the logic to phase the stepper motor clockwise or conterclockwise. Activation of the select signal directs a first step input to the stepper motor. As the motor moves, feedback from an optical encoder generates further steps and self-perpetuated motion is established. A speed signal selects either high or low speed operation by causing a switching device to derive motor steps from the leading and trailing edges of encoding marks positioned around the periphery of the encoding disk. The speed of the stepping motor is directly related to the lead angle of the motor, which may be defined as the angle between the energized motor windings and the motor shaft position. The motor phaser advances the lead angle each time it receives a step pulse. The motor is accelerated to high speed operation by switching the circuitry to generate motor steps from opposite edges of the encoding disk. In switching edges, the lead angle is increased to produce the accelerated torque necessary to obtain the tabulating or slew speed, on the one hand, whereas switching edge in the opposite manner causes the blanking of one step to reduce the lead angle and thereby cause a reduction in speed.

The lead angle may be further modified by delay circuits to provide sensitive speed adjustments.

With all possible motor steps being derived from the encoder disk edges, accelerating steps are separated and spaced by the disk. The spacing provided by the disk guarantees that accelerating steps will not be too abrupt.

Blanking means are provided for deleting pulses generated by the encoder disk edges, and thus deleting motor steps, to reduce the lead angle to provide motor braking action. Additional means are provided for generating a final delayed motor step to cause the motor to detent in a halted position.

A photodetector means is utilized to read a channel of the encoder disk with the output of the optical encoder being directed to an optical decoder. The output signal from the optical decoder provides direction and position information.

In accordance with the invention, a control system comprises rotatable means having a plurality of windings to which driving pulses are applied in a certain sequence to cause said rotatable means to rotate, said rotatable means being variably operable in accordance with variations in the lead angle between energized windings and the rotational position of the rotatable means; first means for providing first signals related to the rotation of said rotatable means, each of said first signals having a leading edge and a trailing edge; second means for providing second signals to said windings, said second signals being related to edges of the same type of said first signals; and means to cause said second means to generate said second signals related to different edges of said first signal, thus varying the phase of said second signals, whereby the lead angle is altered.

It is accordingly an object of the present invention to provide an improved stepping motor control system.

Another object is to provide a closed-loop stepping motor control system which motor step signals are generated by encoding means driven by the stepping motor.

A further object is to provide a closed-loop stepping motor control system in which motor speed may be varied by controlling the manner in which the motor step signals are generated through the closed-loop.

Yet another object is to provide a closed-loop stepping motor control system employing a coded disk from which leading and trailing edge pulses may be taken, and in which motor speed may be varied by controlling which of the leading and trailing edge pulses are used to generate motor step signals.

Yet another object is to provide a stepping motor control system having stability and reliability of operation and high resistance to stalling.

BRIEF DESCRIPTION OF THE DRAWINGS

Other objects and advantages of the invention will be apparent from the following detailed description and the accompanying drawings, in which:

FIGS. 3A, 3B, 3C, 3D, 3E, 3F and 3G taken together constitute flow diagrams showing the sequence of various operations of the stepping motor control system;

FIGS. 4A, 4B, 4C, 4D, 4E and 4F taken together constitute a diagrammatic showing of certain of the logic elements employed in the illustrated embodiment of the present invention;

DESCRIPTION OF THE PREFERRED EMBODIMENT

Figure 1:
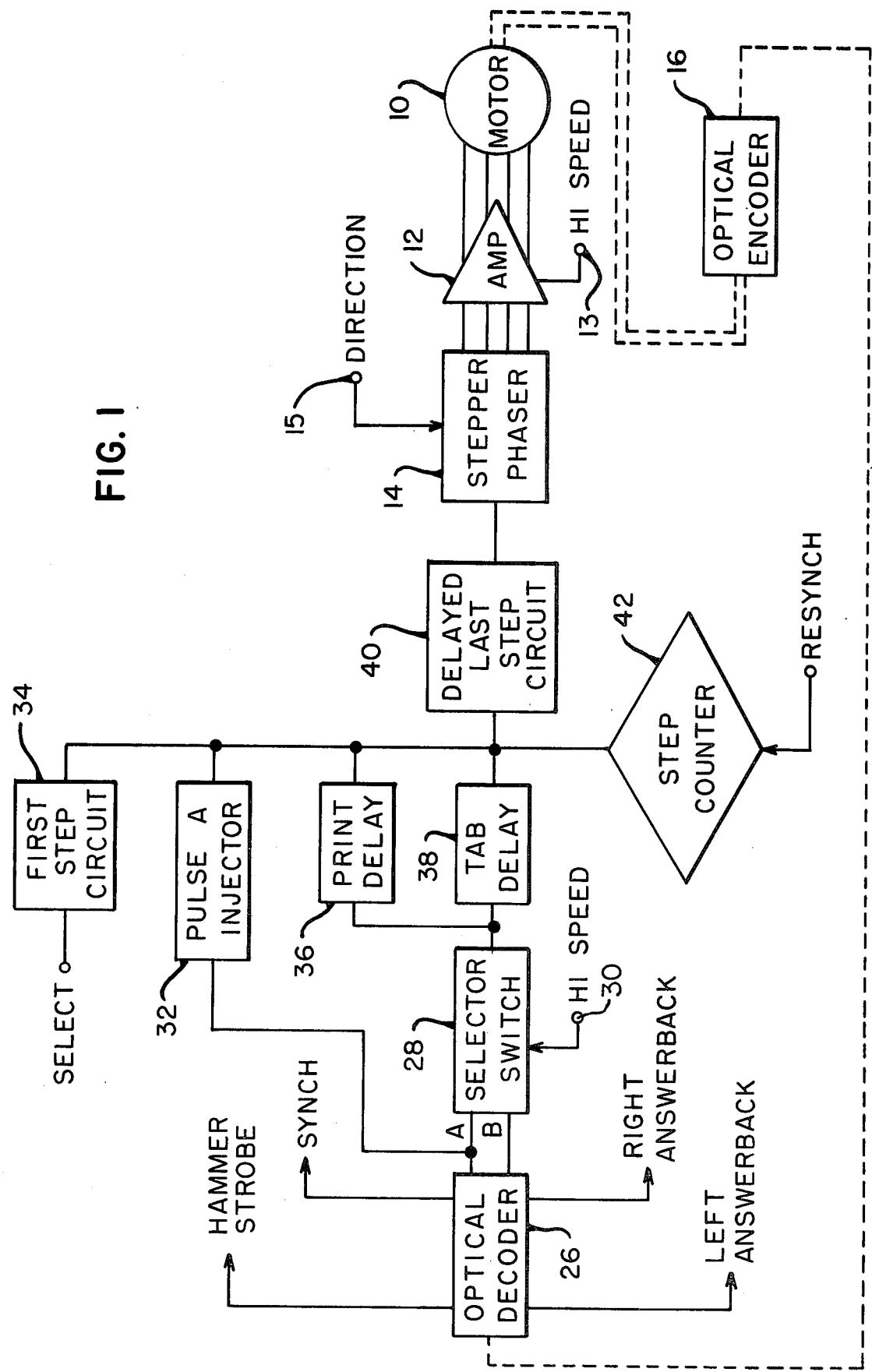
FIG. 1 is a block diagram of a closed-loop step motor control system embodying the present invention.

Referring now to FIG. 1 of the drawings, the system includes a stepping motor 10, which may be used to drive a printing element transversely of record media positioned on a printer carriage. The stepping motor has its windings connected through a plurality of drive circuits to the outputs of an amplifier 12, the inputs of which are connected to a speed control 13 which determines the amplifier voltage in accordance with the motor speed desired, and to the output of a stepper phaser 14 which supplies pulses of proper phase relationship to the motor 10 to cause it to operate in a desired manner. The stepper phaser 14 is controlled by a direction line 15, and by inputs from the remainder of the system of FIG. 1, as will subsequently be described.

Figures 2, 5:
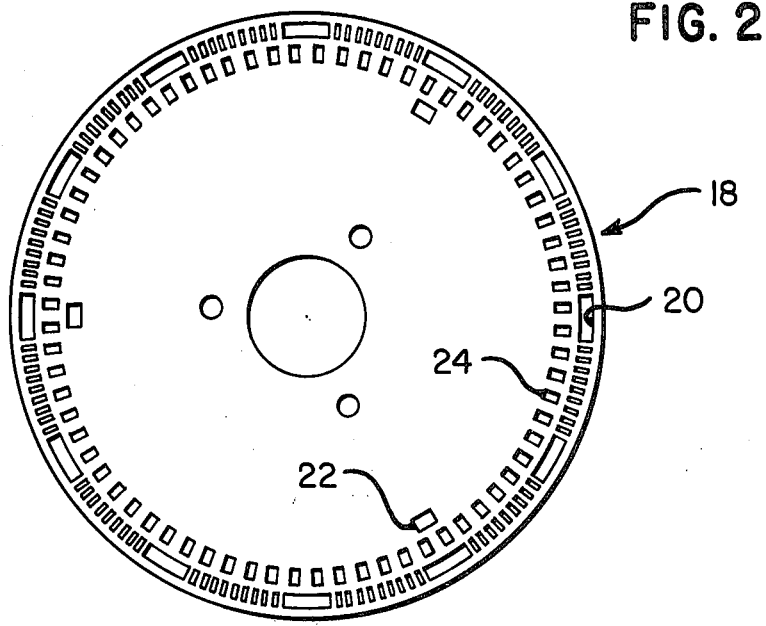
FIG. 2 is a fragmentary view of the encoding disk used in the illustrated embodiment of the present invention.
FIG. 5 shows the manner in which FIGS. 4A to 4F inclusive are to be joined to each other to constitute a unitary logic diagram.
Figure 3B:
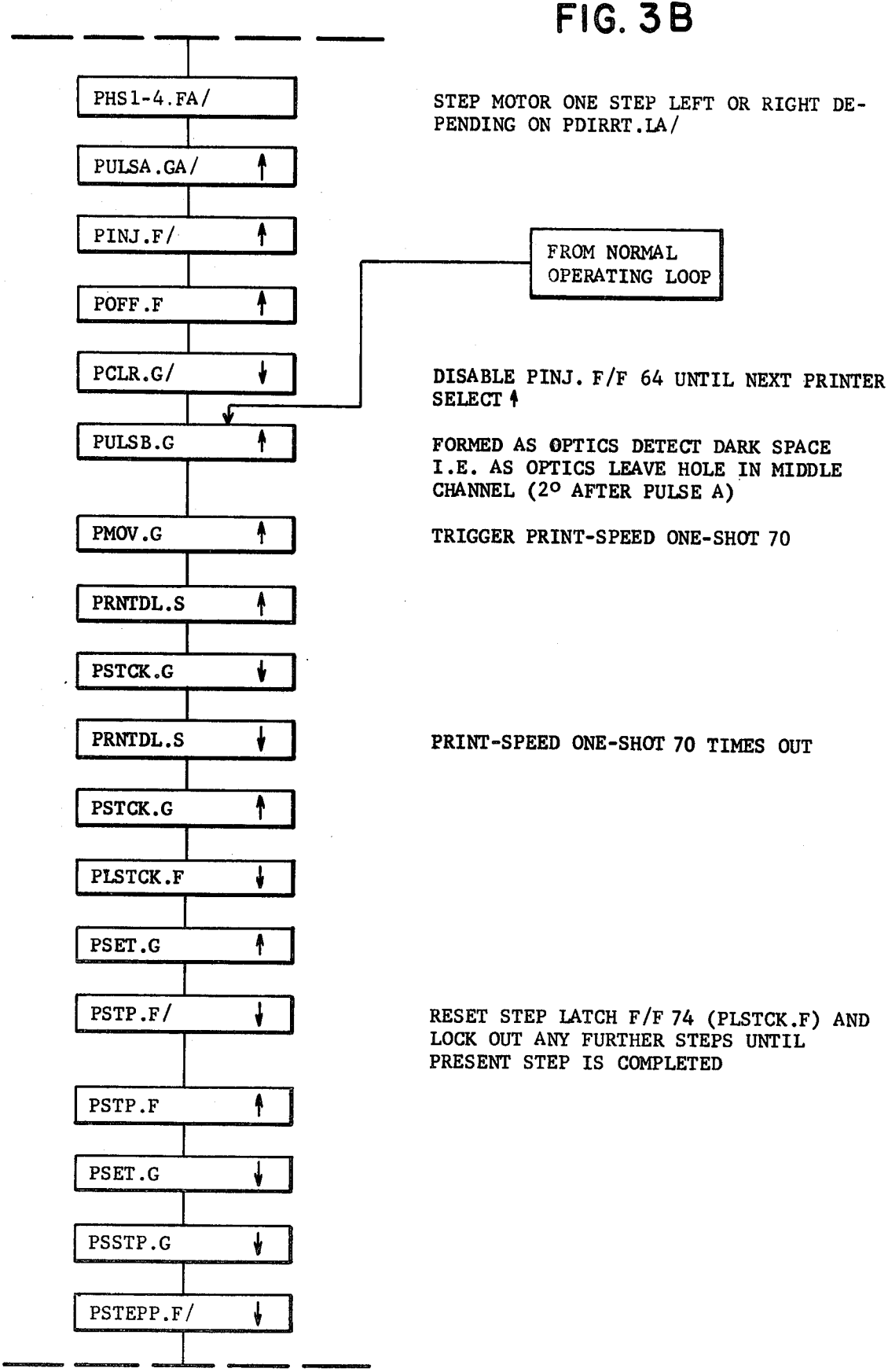
Figure 3F:
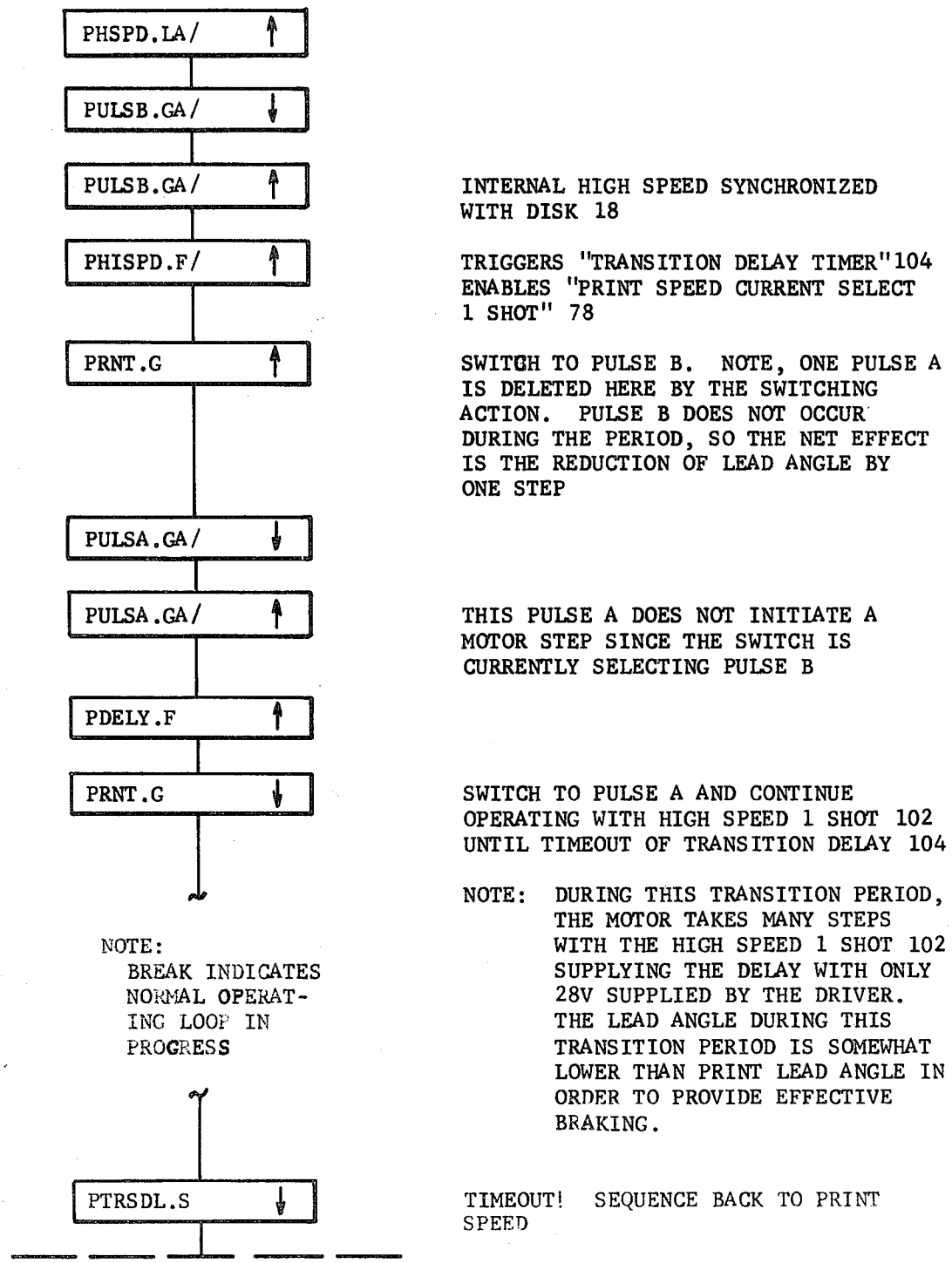
Figure 3G:
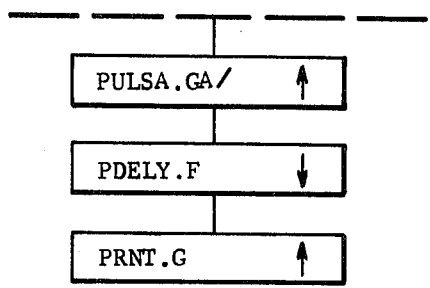

Driven by the motor 10 is an optical encoder 16 which supplies signals to the system to cause the motor to be driven in a synchronous manner. Included in the encoder 16 is an encoding disk 18 which is fragmentarily shown in FIG. 2. The disk includes three concentric tracks of timing apertures, only one of which is of primary interest in the present invention. The outer track 20 is a hammer strobe track which controls the firing of print hammers, but which plays no part in the present invention. The inner track 22 is a synch track, used for synchronizing the operation of the printer, which also plays no direct part in the operation of the present invention. The center track 24 is a motor step pulse generating track, which is utilized in generating the pulses used to drive the stepping motor 10. Two separate displaced sensors (not shown) are included in an optical decoder 26 and are used to sense the track 24 for generation of pulses used in the motor drive circuitry, and in order to enable the direction of rotation of the motor 10 to be determined. Only one sensor is required for the generation of pulses used in the motor drive circuitry, with the second sensor being needed only for determination of the direction of rotation of the motor.

Hammer strobe, synch and left-right answer back information is decoded by the optical decoder 26 and is transmitted to other portions of the printer, as shown generally by the arrows in FIG. 1, extending from the optical decoder 26, but plays no further part in the stepping motor control system.

The motor step pulses A and B (in which pulse A represents the leading edge of each slot in the encoding disk and pulse B represents the trailing edge of each slot in the encoding disk) produced by the optical decoder 26 are provided to a switch 28, which is further controlled by a high speed line 30 to determine, in a particular case, whether the leading or trailing edge of a given motor stepper pulse is to be used in generating a signal for driving the stepping motor. The decision as to which edge is to be used in a given case affects the time interval between drive signals, and thereby affects the lead angle and motor speed and acceleration, as will subsequently be described in greater detail.

The pulse A output from the decoder 26 is also applied to a pulse A injector 32 used in accelerating the motor from a halted condition to printing speed. The control for starting the motor is embodied in a first step circuit 34, controlled by the select signal.

The output from the selector switch 28 is applied to inputs of a print delay 36 and a tab delay 38, one of which is selected, depending upon whether the motor 10 is to be operated at print speed or the faster tab speed. Each of the delays 36 and 38 includes adjustment means for setting the speed of the motor in these two modes to a precise predetermined level.

The outputs from the print delay and the tab delay 36 and 38, as well as the pulse an injector 32 and the first step circuit 34 are applied, subject to control of a delayed last step circuit 40, to be subsequently described, to the input of the stepper phaser 14, to provide the control signals for generating the motor step drive pulses, according to the particular mode of motor operation being employed at the time.

Also subject to the control of the delayed last step circuit 40 and connected to the stepper phaser 14 is the output from a step counter 42. The purpose of the step counter 42 is to cause the motor 10 to be stepped in minimum six step increments, regardless of when the select signal is terminated, to assure that stepping of the motor will not be terminated prior to the completion of printing of a character, the printing of which requires six steps of the print head.

The previously referred to delayed last step circuit 40 is utilized during the halting of the motor. When the motor is to be halted, motor step signals are blanked to cause the motor lead angle to be decreased so that a negative torque is ultimately applied to the motor shaft to halt it. The delayed last step control then applies a pulse to the motor windings to "detent" or lock the motor shaft in a precise position in which it remains until the next motor movement is initiated by the select line being applied to the first step circuit 34.

Figure 6:
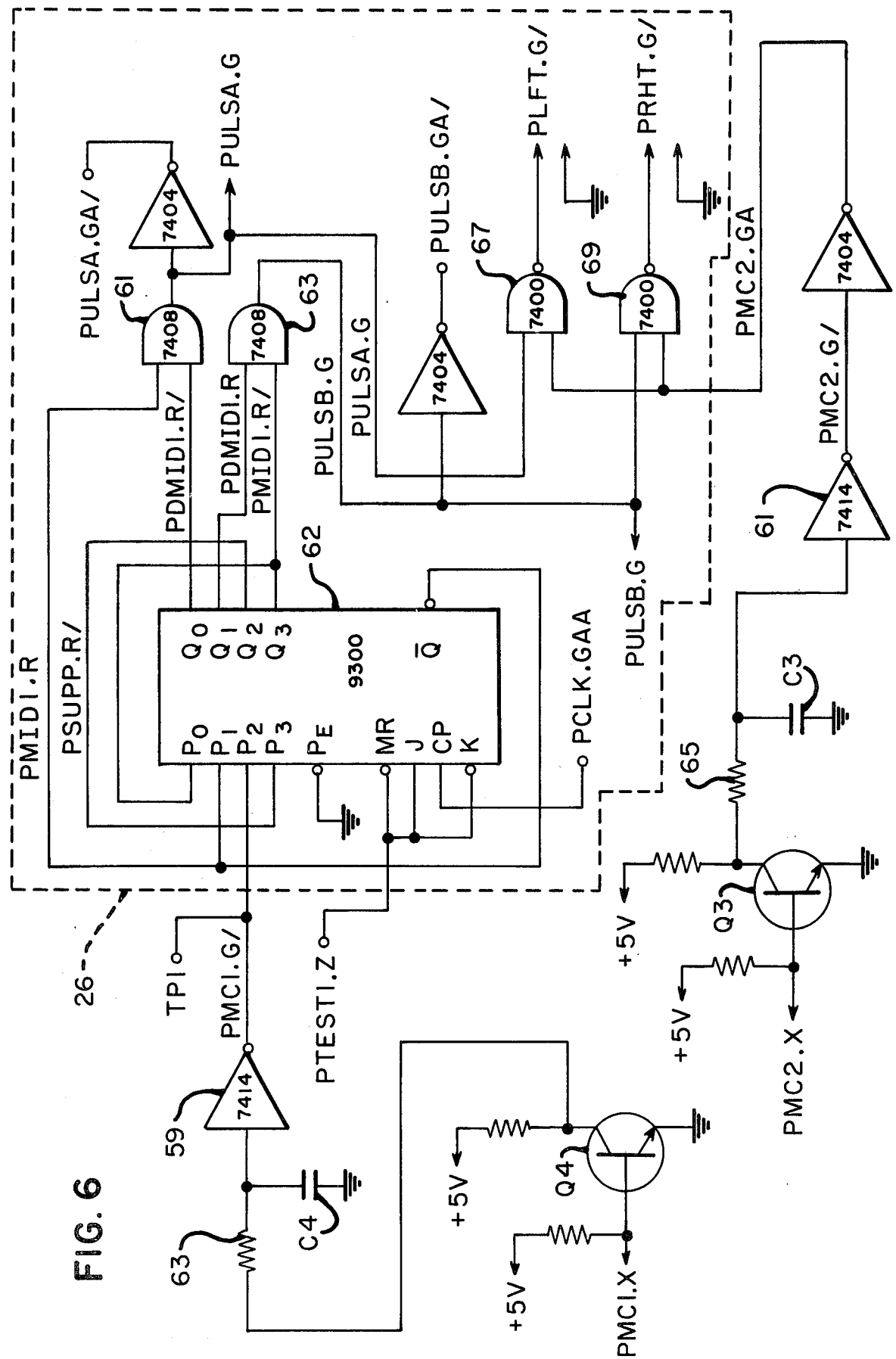
FIG. 6 is a diagrammatic showing of additional logic elements employed in the present invention.

A preferred embodiment of the logic circuitry which appears in block form in FIG. 1 is shown in greater detail in FIGS. 4A to 4F inclusive and FIG. 6. The various input and output terms of this logic circuitry interface with other devices, such as a microcomputer, optical devices, and motor and print controls of a printer system in a conventional manner, forming no part of the present invention.

Figure 7A:
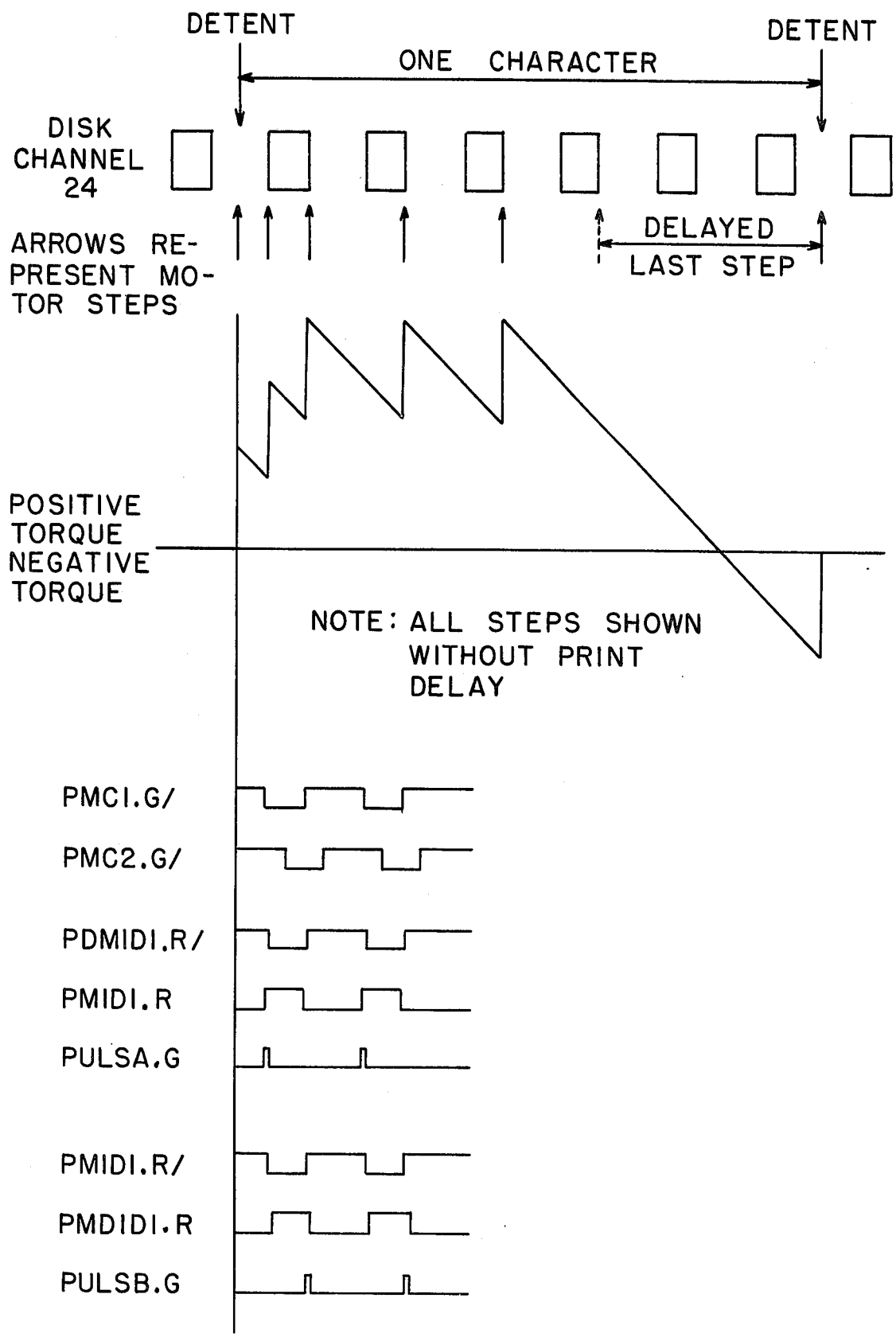
FIGS. 7A and 7B constitute a diagrammatic showing of waveforms useful in explaining the operation of the stepper motor control system of the present invention.
Figure 7B:
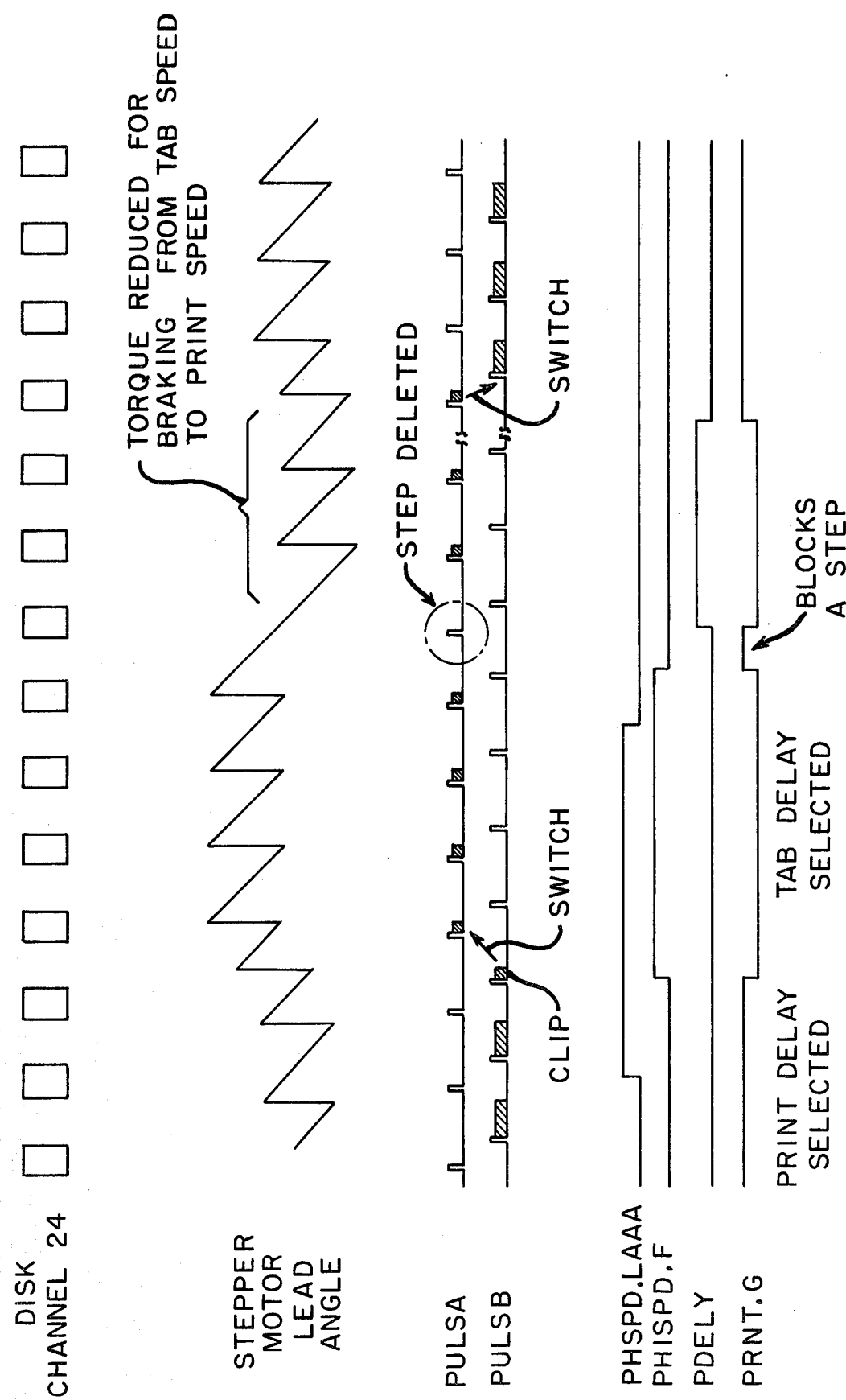

In order to aid in the understanding of these figures, certain groups of logic components in FIGS. 4A to 4F inclusive, corresponding to blocks appearing in FIG. 1, have been identified by dashed line blocks and reference characters in FIGS. 4A to 4F inclusive, which correspond to the blocks appearing in FIG. 1. In addition, the flow diagram of FIGS. 3A to 3G inclusive have been included herewith to describe various sequences of operation, with particular reference to changes in the logic levels of various terms appearing in the logic diagrams, indicated by arrows pointing upward and downward. Furthermore, the waveforms of FIGS. 7A and 7B illustrate the corresponding contemporaneous conditions of various significant terms at certain points during various operating sequences.

Appearing below is a glossary of significant terms utilized in the flow diagrams of FIGS. 3A to 3G inclusive, the logic circuitry of FIGs. 4A to 4F inclusive and 6, and the waveforms of FIGS. 7A and 7B. It will be noted that certain conventions have been followed in naming these terms, each of which begins with the letter "P", followed by an expression which is an abbreviation of the general function with which the term is associated. The suffix of each term includes the letter "G" if the term at that point is an output from a gate; "F" if the term at that point is an output from a flip-flop; "LA" of the term at that point is an output from a latch; "A" if term at that point is an output from a delay; "R" if the term at that point is an output from a register; "S" if the term at that point is an output from a one shot; "/" if the term is active when low. It will be further noted that some terms have a suffix of several characters, indicating passage through several logic components.

| | Glossary of Terms |
|---|---|
| PCLK.G/ | Input clock signal, ideally a square wave, frequency limited only by practical TTL bandwidths. |
| PCLR.G/ | Clears and disables the pulse A inject mechanism until next start up sequence. |
| PCNT.G/ | Indicates the step counter is active and recording present position of the stepper motor within its six step character. |
| PDELY.F | This signal occurs when transitioning from tab to print. The signal acts to first block a single step, thus reducing the lead angle, and secondly it maintains the disk edge switcher in the high speed configuration until the motor speed has reached an acceptable level for resumption of normal print speed operation. |
| PDIRRT.LA/ | Input signal that configures the stepper phaser to count forward or reverse. |
| PDLS.S/ | Delayed last step signal which occurs near the end of the last character and blocks motor steps to provide braking action. Release of this signal creates the final step. |
| PHISPD.F | Internal high speed command which is synchronized with pulse B and indicates tab speed selection. Signal is used in driver circuits to select high current to motor. |
| PHSPD.LA/ | Input signal to select tab speed. Normal operation would expect print speed to be established before receiving high speed command. |
| PHSPDL.S | This signal is active during tab speed operation and is used to adjust motor speed. Longer delays will decrease effective lead angle and decrease motor speed. |
| PHS1.F PHS2.F PHS3.F PHS4.F | Output signals to four phase stepper motor drive circuitry. |
| PINJ.F/ | Used to inject an additional clock pulse to motor phaser during start up. |
| PLFT.G/ | Ouput signal indicating direction of movement. This "Left Answer-back" is generated once for each slot in the disk. |
| PLSTCK.F | Step clocks arriving from the delay circuits are latched to create this signal called Latched Step Clock. |
| PMC1.G/ | Channel one signal as generated by the disk. |
| PMC2.G/ | Channel two signal as generated by the disk. |
| PMC1.X | Low level input signal direct from channel 1 phototransistor. |
| PMC2.X | Low level input signal direct from channel 2 phototransistor. |
| PMFF1.G | Stepper phaser flip-flop input as generated by feedback from other stepper phaser flip-flop and "Direction" input. |
| PMFF2.G | Stepper phaser flip-flop input as generated by feedback from other stepper phaser flip-flop and "Direction" input. |
| PM1D1.R | Channel one optics signal which is synchronized with the input clock and delayed two clock periods. |
| PMOV.G | Trigger input for tab and print speed delay circuits which is derived from either PULSA or PULSB depending on whether the circuit is configured for tab or print speed. |
| PMSTEP.G | Motor step signal which provides clock input to stepper phaser and to step counter. |
| POFF.F | Signal which resets the Pulse A inject circuit, thus blocking further operation until the next start up sequence. |
| PPRNT.SA/ | Output signal used in print speed drive circuits to set current. |
| PRESYN.LA/ | Input signal used as master reset. |
| PRHT.G/ | Right answer back signal indicating direction of movement. Signal is created once for each slot in the disk. |
| PRNT.GA/ | Signal used to select the proper delay circuit for either print or tab mode. |

| | -continued Glossary of Terms |
|---|---|
| PRNTDL.S | Signal which is active during print operation and is used to adjust motor speed. Longer delays reduce motor velocity. |
| PRUN.G | Internal select signal that remains active until step counter indicates completion of six step character. Thus regardless of when PSEL.LA/ goes inactive, circuit will always complete 6 steps. |
| PSEL.LA/ | Input signal which activates the stepper motor to print or tab operation. Signal can be removed anywhere within the first 5 steps of a character for successful halt. |
| PSET.G/ | Step clock input to the coupled step latches. |
| PSSTP.G/ | Feedback input to coupled step latches which is enabled by PRUN.G and modified during stopping sequence by PDLS.S/. |
| PSTCK.G | Clock input to step clock latch as generated by either print or tab delay circuit. |
| PSTEP.LA/ | Diagnostic input that sequences the motor phaser during homing operation or any other time when motor must be discretely stepped. |
| PSTEPP.F/ | Conditioned step signal as modified by delay circuits which creates step inputs to the motor phaser and retriggers the circuit that selects motor current. |
| PSTP.F | Feedback output of the coupled step latches. |
| PSTPCN.G | Stop condition input to delayed last step circuit, which is generated when the circuit is deselected and at step 5 within the 6 step characters. |
| PSUPP.R/ | Channel one optic signal after being synchronized with the high speed clock. |
| PSWA.G/ PSWB.G/ | PULSA and PULSB, opposite edges of the disk, as selected by the switch input, PRNT.G. |
| PTEST1.Z | Reset input used to initialized stepper phaser latches and optic decoder shift register. |
| PTRSDL.S | Transition delay signal is active when switching from tab speed to print speed. |

It is believed that the mode of operation of the novel stepping motor control system in its various operating sequences may be readily ascertained and understood by those skilled in the art from a scrutiny of the logic circuitry of FIGS. 4A to 4F inclusive, when considered with reference to the flow diagrams of FIGS. 3A to 3G inclusive, the waveforms of FIGS. 7A tp 7B, and the glossary set forth above.

In order to further facilitate such understanding, certain system operations will now be described, with particular reference to the logic circuitry of FIGS. 4A to 4F inclusive and 6. It may be noted that in these figures, numeric or alpha-numeric designations are placed within the various logic elements. These identify the various elements as to type, in accordance with a recognized identification system. OR gates 49, 50, 51, 53 and 89 are not provided with such designations. Any appropriate non-inverting line receiver could serve as a functional replacement for these elements.

The manner in which the printer is selected and is caused to commence operation at print speed and then to halt after one character will now be described. The P SELECT term PSEL.LA/ is input to an OR gate 50 (FIG. 4C), from which the term is distributed to a plurality of logic devices, the most important being those which generate the first motor step, which will presently be described.

The term PSEL.LAA/ from the gate 50 is presented at NAND gate 52, (FIG. 4D), whose output is the term PRUN.G. PRUN.G goes high at the three-input NAND gate 54 (FIG. 4C) whose output is PSSTP.G, which is presented to flip-flop 56 (FIG. 4D), which has an output PSTEPP.F/. This output goes low, and is applied to the three-input NAND gate 58 (FIG. 4E), the output PMSTEP.G of which will then go high. The NAND gate 58 forms part of the stepper phaser 14, which is of conventional design and also includes flip-flops 55 and 57. This clock input to the stepper phaser then sequences the stepper phaser one step, to generate the first motor step.

Figure 4A:
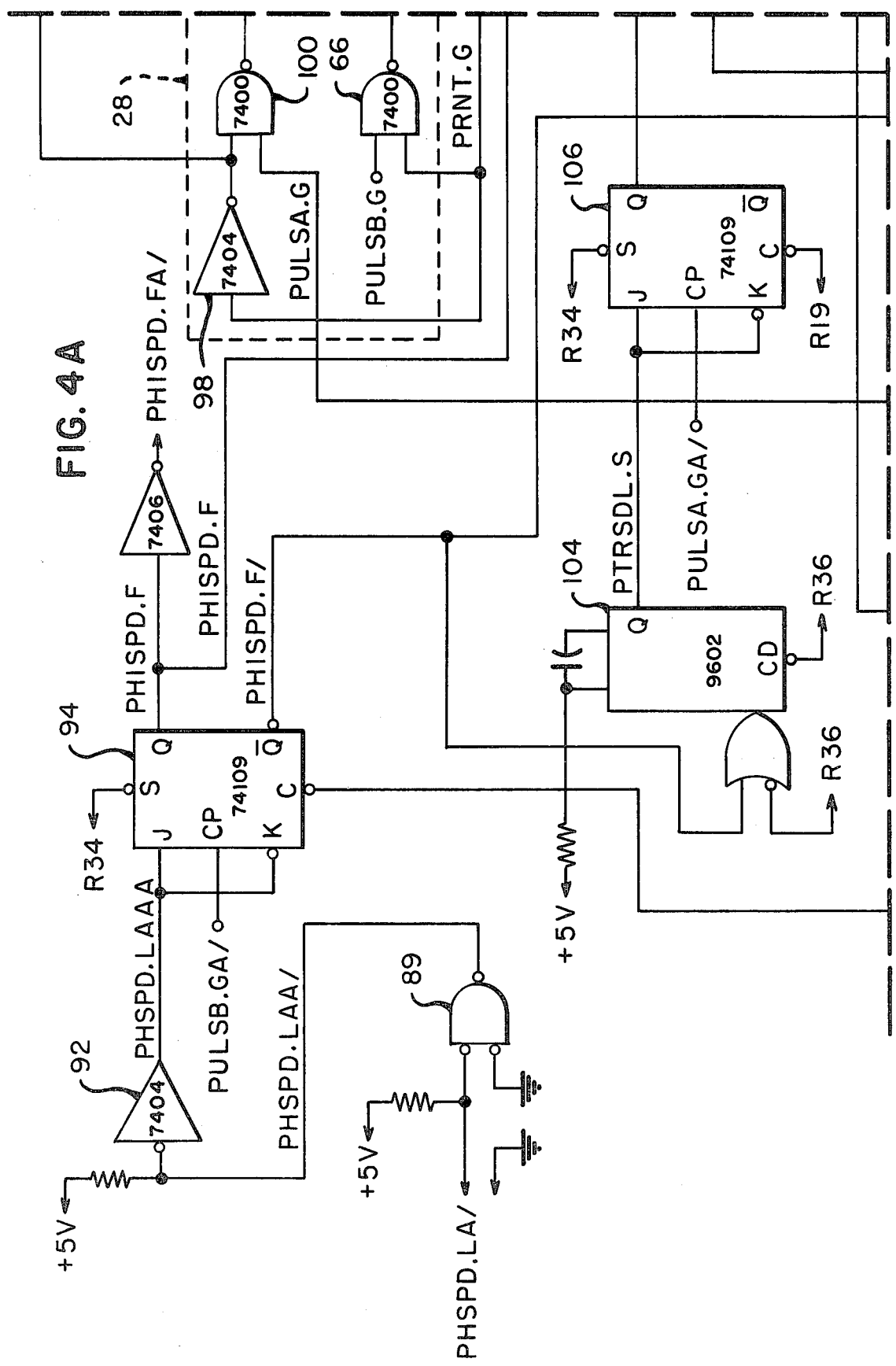
Figure 4B:
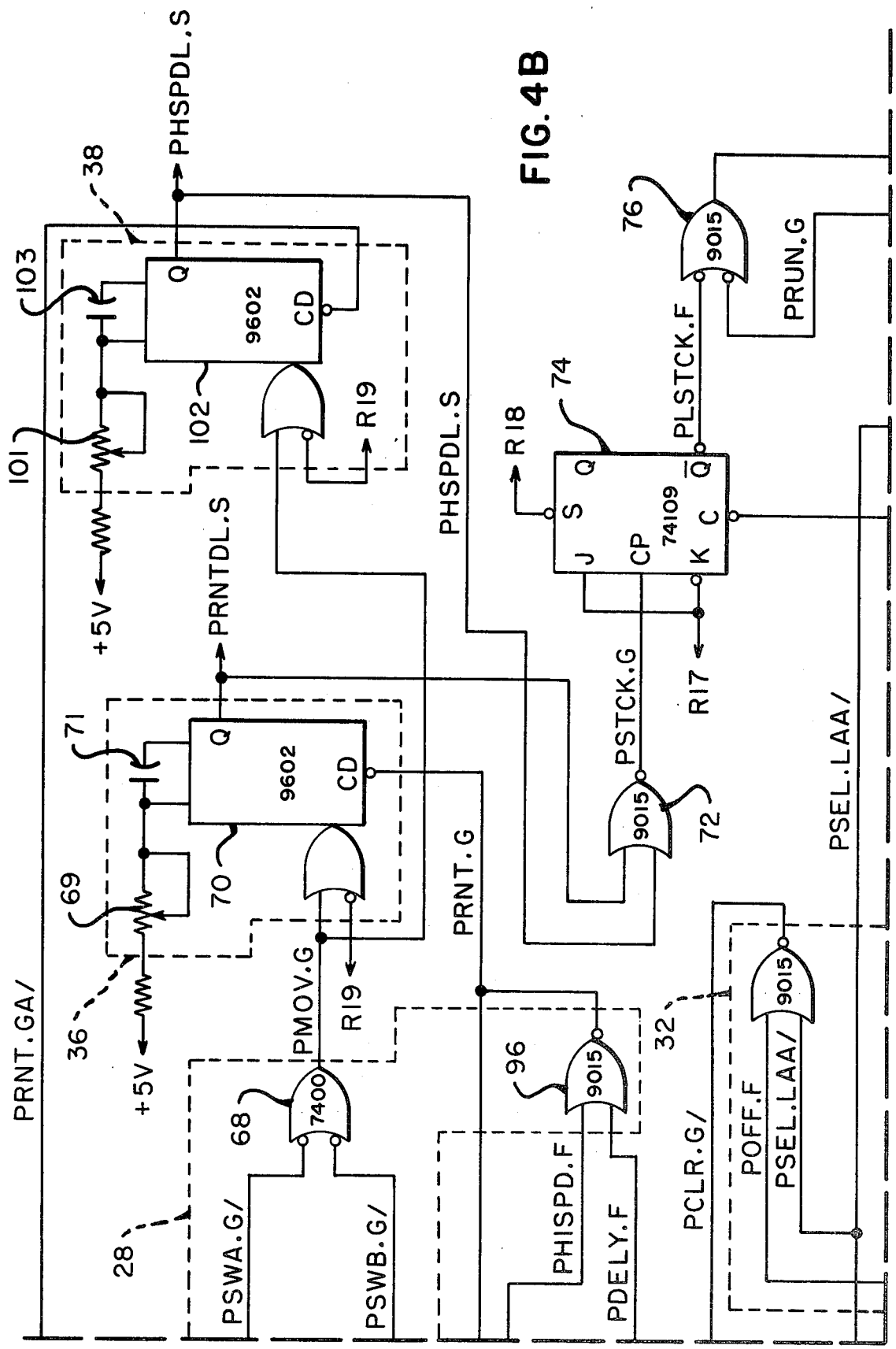
Figure 4C:
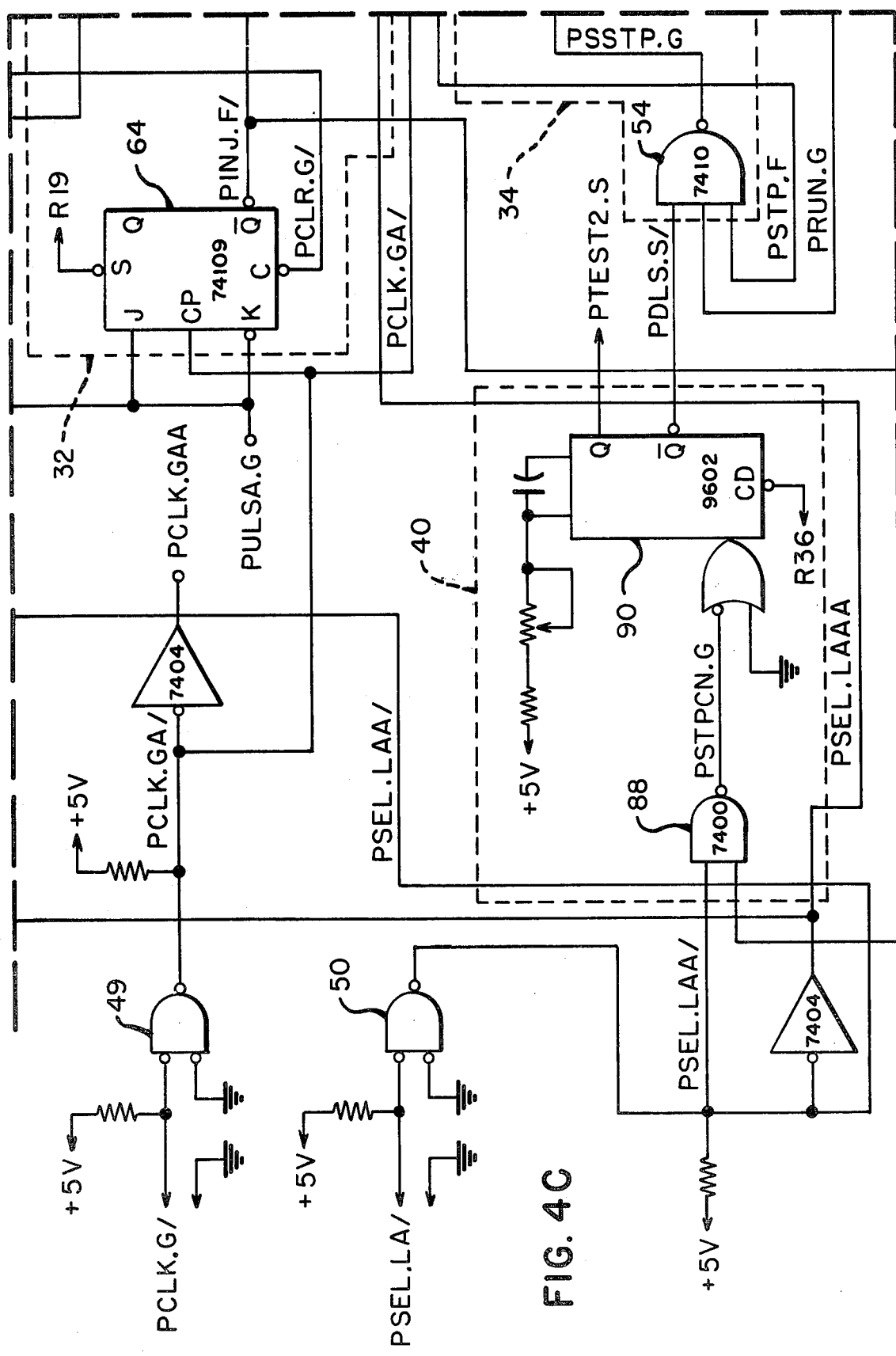
Figure 4D:
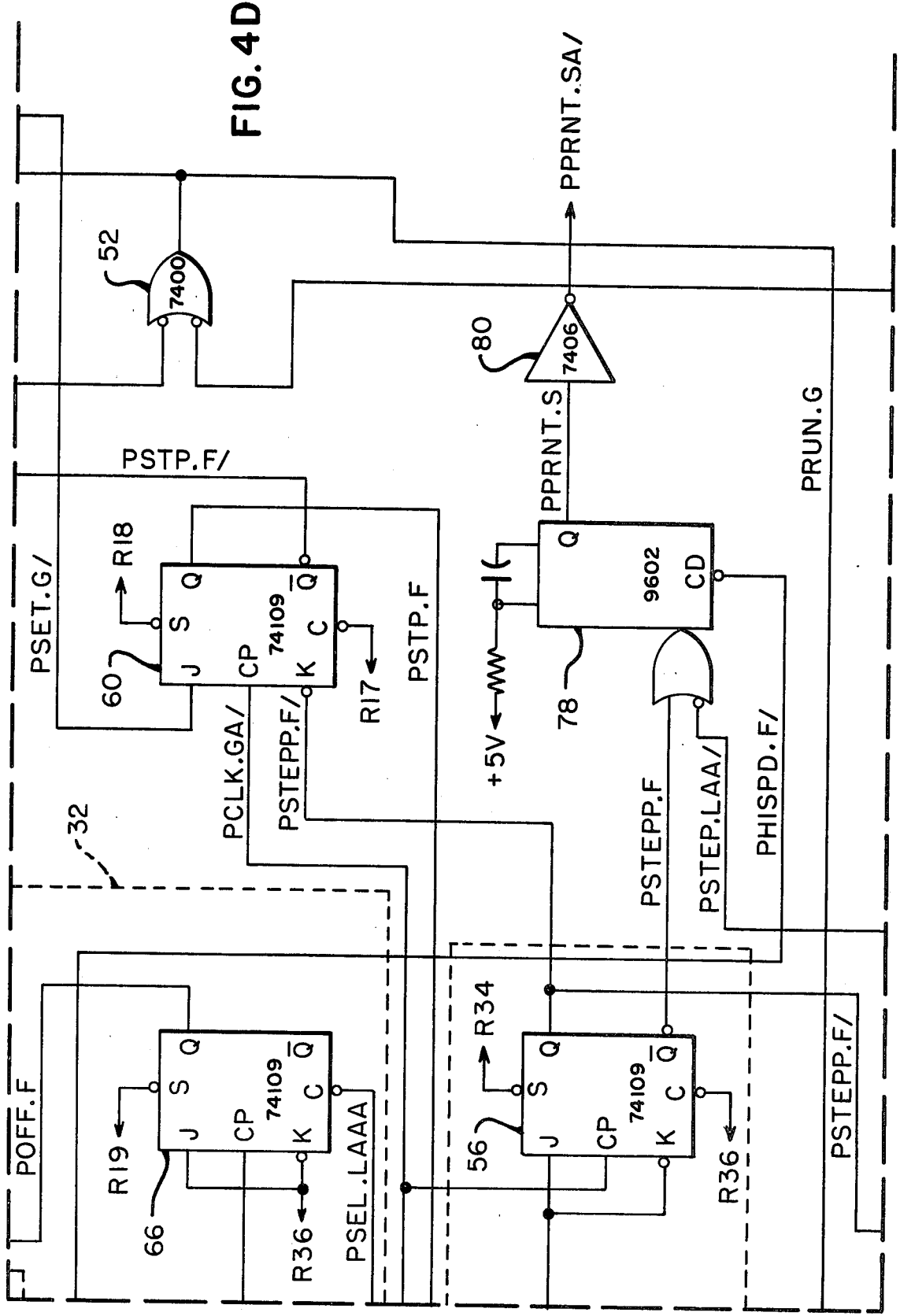
Figure 4E:
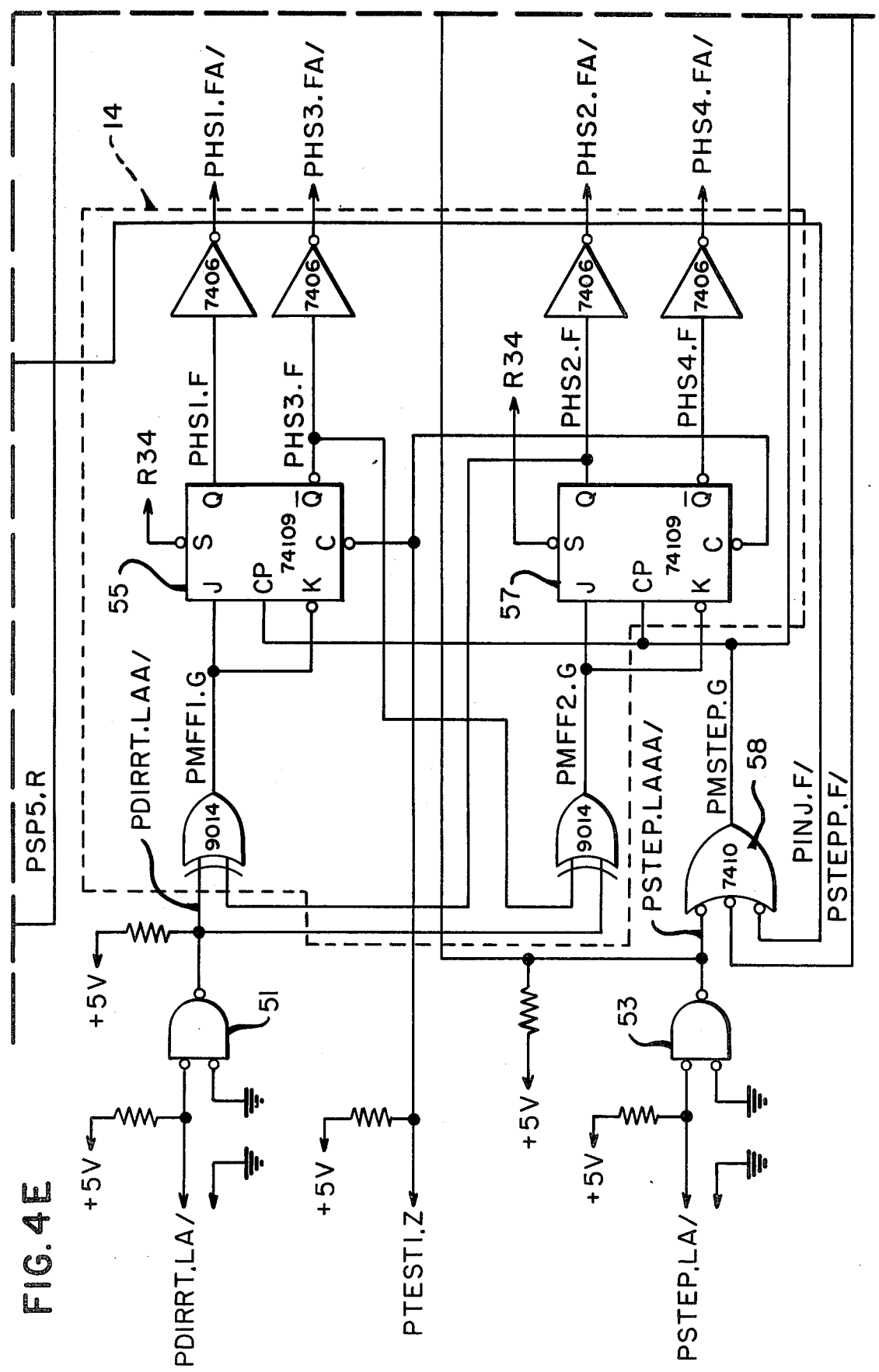

At the same time, the term PRUN.G also initiates other actions to complete this first step. At NAND gate 52 the input PRUN.G going high causes the term PSET.G to go low. This low input is provided to flip-flop 60 (FIG. 4D). Since the term PSTEPP.F/ had already gone low, there are now two low inputs to the flip-flop 60. On the next clock pulse from PCLK.GA/, the output PSTP.F of flip-flop 60 will go low.

This output is presented to one input of the NAND gate 54 (FIG. 4C) of the first step circuit 34. This input going low will cause the output of the gate 54 to go high, thus resetting the flip-flop 56. This completes the first step and the coupled latches 56 and 60 will remain in this condition until the encoding disk 18 has moved one and one-half degrees.

After the disk has moved this distance, the optics sensing the disk detect a channel one transition, which causes the term PMC1.G/ (FIG. 6) to go low. It may be noted that the optics include a pair of phototransistors (not shown) which generate the signals PMC1.X and PMC2.X. These signals are amplified by transistors Q3 and Q4 respectively, and shaped by logic elements 59, 61 in combination with resistors 63, 65 and capacitors C4 and C3, respectively. NAND gates 67, 69 are utilized to provide signals PLFT.G/ and PRHT.G/ to the system to indicate the direction of disk rotation in accordance with the sequence in which the signals PMC1.X and PMC2.X are received from the phototransistors.

The input PMC.G/ is provided to the shift register 62 (FIG. 6) of the optical decoder 26.

The optical decoder is designed so that the shift register 62 inverts and delays the signal from the optics, which is then presented at AND gates 61 and 63 to provide an edge detection function which generates a pulse PULSA.G on falling edges of the channel signal and a pulse PULSB.G on rising edges of the channel signal. The channel signal is PMC/.G/. Thus when the disk 18 moves 1.5 degrees the first edge is detected and a pulse A is created, which arrives at the pulse A injector circuit 32, so PULSA.G arrives at flip-flop 64 whose active low output PINJ.F/ will go low. This low-going output is presented to one input of the NAND gate 58 associated with the stepper phaser 14. This input going low will cause the stepper phaser clock signal PMSTEP.G to go high, thus sequencing through one more step, so that two steps have now been completed.

The coupled latches 56 and 60 were not used for this step, and at this time are awaiting a pulse B signal. Since the selector switch 28 is in the low speed position, only pulse B's will pass through the delay circuits, causing normal steps, so after two more degrees of movement of the disk, a pulse B signal PULSB.G which is decoded by the optical decoder 26 is presented to the selector switch NAND gate 66 (FIG. 4A). Since the PRNT.G signal is high, which it normally is in low speed operation, the pulse B is passed through the gate 66 and a NAND gate 68 (FIG. 4B) to a one shot 70 in the print delay circuit 36. A potentiometer 69 and a capacitor 71 are connected in the circuit of the one shot 70 to enable the print delay time to be adjusted. The one shot 70 is triggered by the signal PMOV.G and consequently transitions to a high logic level. The high output from the print delay circuit 36 is called PRNTDL.S.

When this signal just named goes low after time-out, it is passed through the NOR gate 72 to create a clock input to flip-flop 74. The active low output PLSTCK.F from the flip-flop 74 will transition low and will cause the NAND gate 76 output PSET.G to go high. This output going high is presented to the flip-flop 60 (FIG. 4D). Since both inputs to flip-flop 60 are now high, on the next clock pulse the output PSTP.F will shift to a high logic level. At the same time the active low output of the flip-flop 60 will go low, thus resetting the flip-flop 74.

The active high output from flip-flop 60 is presented to the NAND gate 54 (FIG. 4C), which forces output PSSTP.G of the gate 54 low. This output is presented to flip-flop 56. On the next clock pulses this low input is passed to the output PSTEPP.F/, which is presented to the stepper phaser 14 to clock it as before. The output PSTEPP.F is also presented to the one shot 78, which has an output PPRNT.S which passes through an inverter 80 to another part of the system to select current for the motor driver.

The inputs to the NAND gate 58 (FIG. 4E) cause the term PMSTEP.G to sequence the stepper phaser 14.

In addition, this signal PMSTEP.G is presented to the shift register 82 (FIG. 4F) of the step counter 42. This shift register, together with an associated flip-flop 83, is connected in such a way that it will ripple through the outputs a single one bit, thus providing a counter that will count from 1 to 6 and then reset itself. In this case, the term PMSTEP.G has cycled three times, so the register 82 will have a one bit at PSP3.R. The presence of a one bit anywhere on the output of the counter acting through gates 84 and 86 generates an active signal PCNT.G/, which is applied to the OR gate 52 (FIG. 4D) along with the signal PSEL.LAA/ to generate a PRUN.G signal to guarantee that the mechanism will take six steps minimum.

It should be noted that the coupled latches 56 and 60 are reset early in the carrying out of this third step, which is the first step to be controlled by the print delay mechanism. Early in the carrying out of the third step, the flip-flop 60 was set high. This high-going signal was presented to the NAND gate 58 of the stepper phaser 14 via the NAND gate 54 and the flip-flop 56. The active low signal was presented to the flip-flop 74 (FIG. 4B) whose output is named PLSTCK.F. The clearing input to this flip-flop acted through the gate 76 to remove the signal PSET.G, and then was forced back low. So as this point the flip-flop 60 has a J input PSET.G which is low and a K input which is still high. During the early part of the step, the term PSTP.F appeared high at the NAND gate 54 whose output PSSTP.G accordingly went low, and accordingly flip-flop 56 had its output go low. Then on the very next clock pulse, flip-flop 60 had both of its inputs low which allowed its output PSTP.F to go low, so that both latches 56 and 60 were in their stable condition and awaiting the next input from the delay circuit. It will be seen that two events are taking place simultaneously; a signal from the coupled latches is passed to the stepper phaser, and another signal is fed back to clear the latches.

The sequence now has been described for three complete steps. The first two steps are sequenced to the stepper phaser 14 without delay of any kind, while the third step is passed through the print delay 36 and takes the standard route for steps being detected from the disk 18.

All further steps would in like manner pass through the optical decoder 26, be selected by the selector switch 28, and then pass through the print delay 36 which then triggers the coupled latches. The coupled latches present their output to the stepper phaser 14 and also feed back on themselves to clear the step. This operation would continue synchronously with the rotation of the disk 18 until it is desired to halt the system. This is accomplished by effectively removing the select term PSEL.LA/ by causing it to shift to a high logic level.

When this occurs, the delayed last step circuit 40 (FIG. 4C) waits until the step counter 42 is in position 5 which means that NAND gate 88 will have two active high inputs, term PSP5.R, indicating step 5, and term PSEL.LAA/, indicating no selection. This coincidence forces the output PSTPCN.G low, which triggers a one shot 90 whose output PDLS.S/ goes low. This low output is presented to the NAND gate 54, which blocks all further steps, and keeps the coupled latches from being triggered or being activated, so that no matter how many steps would occur, the delay last step output would block the steps.

The time-out condition then occurs and presents a high input to the NAND gate 54, which essentially creates a step just as the term PRUN did during step 1, so PDLS.S/ on time-out will go high. This forces the output PSSTP.G of the gate 54 to go low. This low-going output then is presented to flip-flop 56 which, on the next clock pulse, passes the output PSTEPP.F/ back to the gate 58 of the stepper phaser 14 to create the final step. Also PSTEPP.F/ is presented to the flip-flop 60. The inputs to flip-flop 60 are both low as this time. Consequently on the next clock pulse, the output PSTP.F will transition low and be fed back into the three input NAND gate 54, thus completing the cycle once again. This completes the description of the functioning of the logic elements for printing a single character on the print speed mode. Reference may be had to the waveforms of FIG. 7A for showing the variation in the positive and negative torque applied to the motor, with relation to the logic levels of the various terms and the timing of the apertures of the disk 18.

The next description assumes that the circuit is already running at print speed and that it is desired to shift to tab speed, which is a higher rate. The left portion of FIG. 7B shows the variation in the stepper motor lead angle (which is directly related to torque and speed) with relation to the logic levels of the various terms and the timing of the apertures of the disk 18, as a transition from print speed to tab speed takes place.

The high speed input term PHSPD.LA/ would go active, and is presented through a gate 89 (FIG. 4A) and an inverter 92 to a flip-flop 94. Operation of the flip-flop 94 is clocked by the term PULSB.GA/, which synchronizes the tab speed command with the encoding disk 18. The output of the flip-flop 94 then becomes active, and the PHISPD.F output is presented to the selector switch 28 whose NOR gate 96 goes active, causing the output PRNT.G to go low, thus selecting pulse A instead of pulse B, through operation of the inverter 98 and the gates 100, 66 and 68.

As the disk 18 turns and pulse A's and pulse B's are both presented to NAND gates 66 and 10, pulse A's will be selected and passed on, and also the selector switch 28 output PRNT.G selects the tab delay circuit instead of the print delay circuit by applying a clearing pulse to the clear input of the flip-flop 70 (FIG. 4B), while the tab delay flip-flop 102 (FIG. 4B) is not cleared, but is maintained operative. The term PULSA.G is presented at the input of gate 100 from the optical decoder 26 (FIG. 6) along with the signal PRNT.GA/. Thus the signal PSWA.G/ is generated and passed through the NAND gate 68 to create the signal PMOV.G, which triggers the tab delay one shot 102, which has an output PHSPDL.S. The signal PMOV.G also attempts to trigger the print delay one shot 70, but cannot do so, since that one shot is cleared by the previously-mentioned signal PRNT.GA.

A potentiometer 61 and a capacitor 103 are connected in the circuit of the one shot 102 to enable the tab delay time to be adjusted. The output PHSPDL.S is presented to NOR gate 72 and passed to flip-flop 74 via the input called PSTCK.G. The output of the flip-flop 74 is then passed in a similar manner to that described for the low (or print) speed operation through the same coupled latches 56 and 60 of the first step circuit 34 to the stepper phase 14.

The output PHISPD.F/ of the flip-flop 94 is presented to the one shot 78. This low-going signal clears the one shot 78 and resets the signal PPRNT.SA/, thus not selecting normal print current. The high speed output which goes to another part of the system from the inverter 80 then selects a high current from the motor driver. High (or tab) speed is thus achieved under control of the signal PHSPD.LA by transitioning from print speed by selecting a different edge of the disk 18, from which signals, are sensed by switching to a different delay circuit, and by increasing the current level to the motor driver.

In the process of switching by the selector switch 28 from print speed to tab speed, the print delay one shot 70 is in the middle of a time-out mode at the time that it is cleared by the term PRNT.G. Since the one shot 70 was in the process of timing out when it was cleared, this effectively shortens the delay. Now this shortened delay is allowed to pass on as if the one shot had timed out normally, and in FIG. 7B, an arrow is shown, accompanied by the word "clip", referring to the shortened delay period. This "clip" is necessary since a different edge of the disk 18 is to be selected for sensing, and this edge will be sensed within a very short period of time to generate a pulse A, which will fire the tab delay one shot 102, which is designed to time-out much more quickly than the print delay one shot 70. A "clip" also occurs during a transition from tab speed down to print speed, but is not required for proper operation of the circuit.

Each motor step pulse is derived from the optical decoder 26 acting in cooperation with the optical encoder 16 and is delayed a predetermined amount by either the print delay 36 or tab delay 38 before being transmitted to the stepper phaser 14. The print delay and the tab delay thus have the effect of decreasing the electrical lead angle, and since their delays are of different durations, the electrical lead angle is decreased by different amounts. Thus the net electrical lead angle when the system is operating in the print mode is less than the net electrical lead angle when the system is operating in the tab mode, due to the fact that the print delay is greater than the tab delay. Because of the fact that the motor torque is directly related to the lead angle in the normal operating portion of the torque curve, a greater torque is generated by the motor in the tab mode of operation than in the print mode of operation. Since it is also true that a higher torque produces acceleration of the motor, and greater speed, as noted, for example, in the U.S. Pat. No. 3,736,488 to Abraham et al., the motor 10 will accelerate to a different (higher) frequency (or step rate) when in the tab mode of operation, during which the tab delay 38 is operative, than in the print mode of operation, when the print delay 36 is operative. As motor speed increases, motor torque is balanced by back EMF and system inertia, so that a steady-state average speed condition is reached and maintained until deceleration.

The acceleration of the motor when shifted from print speed to tab speed is aided by the change in lead angle provided by shifting from use of a pulse derived from one edge of the channel signal PMC1.G/ to use of a pulse derived from the other edge of the channel signal PMC1.G/ under control of the switching means 28. It will be noted that operation of the switching means 28 is controlled by the same signal PHSPD.LA/ as control selection of one or the other of the two oneshots 70 and 102 in the print delay 36 and the tab delay 38, respectively.

Thus if the motor 10 is running at print speed, utilizing the trailing edges of the pulses PULSB.G derived from the trailing edges of the disk slots, and it is desired to shift to tab speed, application of a PHSPD.LA/ signal to the switching means 28 causes the leading edge, rather than the trailing edge, of the next slot in the disk 18 to be utilized for generation of the signal PULSA.G from which the next motor step pulse is derived, so that a shorter time between successive signals results, and the lead angle is effectively increased, changing the signal phase, and accelerating the motor. By this switching of signal derivation from trailing edges to leading edges of the slots in the disk 18, the lead angle is adjusted in a relatively gradual manner, thus providing resistance to motor stalling.

Next to be described is the transition of the system from tab (or high) speed to print (or low) speed. The right portion of FIG. 7B shows the variation in the stepper motor lead angle (which is directly related to torque and speed) with relation to the logic levels of the various terms and the timing of the apertures of the disk 18 as a transition from tab speed to print speed takes place. This involves a transition delay circuit which is comprised of one shot 104 (FIG. 4A). Let it be assumed that the signal input PHSPD.LA/ has been removed, so that the logic level has gone high. This high-going signal is presented to and inverted at the inverter 92, which provides a low input to the flip-flop 94. On the next pulse PULSB.GA/, which is the clock input, the output signal PHISPD.F of the flip-flop 94 will go to its inactive state. This signal is presented to the transition delay one shot 104; and will cause it to be triggered. The high speed PHISPD.F output of the flip-flop 94 is also presented to the OR gate 96, and the output PRNT.G of gate 96 will temporarily go high, thus selecting the print delay and causing the selector switch 28 to select pulse B. When the next signal PULSA.GA/ is presented to flip-flop 106 )FIG. 4A), the transition delay one shot 104, which was previously triggered, will have its output passed on through said flip-flop as a signal PDELY.F. This signal, acting through the OR gate 96, then reverses the PRNT.G output to the selector switch 28, thus returning the selector switch to high speed operation.

The net effect of this sequence is to eliminate one pulse A that would have normally caused a step in the normal manner. The lead angle has been reduced 5 degrees by blocking one step, thus causing a reduction in the speed of the motor from tab speed to print speed.

The transition delay of the one shot 104, however, is approximately 60 milliseconds long and holds the selector switch 28 in the high speed mode despite the fact that the input signal PHSPD.LA/ has been terminated. This transition delay then allows the operation of the motor to slow down to a safe level before the selector switch 28 is switched back to selecting pulse B with the associated longer delay of the one shot 70 for print speed. When the one shot 104 times out, the output signal PTRSDL.S goes low. On the next occurrence of pulse PULSA.GA/ the output PDELY.F of the flip-flop 106 goes low, causing the output PRNT.G of the OR gate 96 to go high. This high-going output is presented to the NAND gate 66 and then selects pulse B for the rest of the operation. The signal PRNT.G going high also selects the print delay 36 by removing the clear signal from the one shot 70. This then completes the description of the transition from tab speed to print speed.

Although the invention has been described and illustrated in detail, it is to be clearly understood that the same is by way of illustration and example only, and is not to be taken by way of limitation, the spirit and scope of the invention being limited only by the terms of the appended claims.

What is claimed is:

1. A control system, comprising:
   rotatable means having a plurality of windings to which driving pulses are applied in a certain sequence to cause said rotatable means to rotate, said rotatable means being variably operable in accordance with variations in the lead angle between energized windings and the rotational position of the rotatable means;
   first means for providing first signals related to the rotation of said rotatable means, each of said first signals having a leading edge and a trailing edge;
   second means for providing second signals to said windings, said second signals being related to edges of the same type of said first signals; and
   means to cause said second means to generate said second signals related to different edges fo said first signals, thus varying the phase of said second signals,
   whereby the lead angle is altered.

2. A stepping motor control system, comprising:
   a stepping motor having a plurality of windings to which driving pulses are applied in a certain sequence to cause said motor to operate in a certain direction, said motor being operable at varying speeds in accordance with variations in the lead angle between energized windings and the motor shaft position;
   drive means for applying driving pulses to the windings of said motor to cause the motor to be driven at a speed proportional to the frequency of said pulses;
   feedback means operated by said motor to provide feedback pulses related to the rotation of said motor, each of said pulses having a leading edge and a trailing edge;

control means for providing control signals to the drive means, said control signals being derived from the consecutive leading edges or trailing edges of the feedback pulses from the feedback means; and switching means to cause the control means to generate consecutive control signals derived from different edges of consecutive feedback pulses, thus varying the phase of said control signals, whereby the lead angle is altered to change the speed of the motor.

3. The stepping motor control system of claim 2 in which the feedback means includes a coded disk driven by the motor, and means to derive signals from said coded disk.

4. The stepping motor control system of claim 3 in which the disk is optically coded, and in which the means to derive signals therefrom are optical sensing means.

5. The stepping motor control system of claim 4 in which the disk is apertured to provide optical coding.

6. The stepping motor control system of claim 3 in which multiple sensing means are employed to derive signals from said coded disk to provide information as to the direction of rotation of the disk.

7. The stepping motor control system of claim 2 in which additional means are coupled to the control means to initiate movement of the motor from a halted condition.

8. The stepping motor control system of claim 2 in which adjustable means are coupled to the control means to vary the speed of the motor in any of a plurality of operating modes.

9. The stepping motor control system of claim 2 in which directional control means are coupled to the control means to alter the direction of operation of the motor.

10. The stepping motor control system of claim 2 in which blanking means are coupled to the control means for deletion of signals derived from feedback pulses for causing the speed of the motor to be decreased.

11. The stepping motor control system of claim 10 in which said blanking means are effective to reduce the lead angle sufficienlty to provide motor braking action.

12. The stepping motor control system of claim 10 in which additional means are coupled to the control means for generating a final delayed driving pulse to cause the motor to detent in a halted position.

13. The stepping motor control system of claim 2 in which pulse injection means are coupled to the control means for causing the speed of the motor to be increased.

14. The stepping motor control system of claim 2, also including high speed delay means coupled to the control means.

15. The stepping motor control system of claim 14, in which said high speed delay means is adjustable.

16. The stepping motor control system of claim 14, in which said high speed delay means provides a printer tabulating speed.

17. The stepping motor control system of claim 14, in which said high speed delay means includes a one shot device.

18. The stepping motor control system of claim 2, also including low speed delay means coupled to the control means.

19. The stepping motor control system of claim 18, in which said low speed delay means is adjustable.

20. The stepping motor control system of claim 18, in which said low speed delay means provides a printing speed.

21. The stepping motor control system of claim 18, in which said low speed delay means includes a one shot device.

22. The stepping motor control system of claim 2, also including counting means coupled to the control means to require said stepping motor to stop only after traversing a predetermined number of steps or a multiple thereof.

23. The stepping motor control system of claim 2, also including high speed delay means, low speed delay means, both coupled to the control means, and selecting means for selecting one of said two delay means.

24. The stepping motor control system of claim 23, in which said selecting means is associated with said switching means.

25. The stepping motor control system of claim 2 in which the consecutive control signals generated from the control means are derived from the trailing edge of a first feedback pulse and the leading edge of a second feedback pulse.

26. A stepping motor control system, comprising:

a stepping motor having a plurality of windings to which driving pulses are applied in a certain sequence to cause said motor to operate in a certain direction, said motor being operable at varying speeds in accordance with variations in the lead angle between the energized windings and the motor shaft position;

drive means for applying driving pulses to the windings of said motor to cause the motor to be driven at a speed proportional to the frequency of said pulses;

encoding means including an apertured encoding disk operated by said motor to provide feedback signals related to the rotation of said motor;

decoding means optically coupled to said encoding means for generating feedback pulses in response to the feedback signals provided by the encoding means, seach of said pulses having a leading edge and a trailing edge;

stepper phaser means for providing stepping signals to the drive means in response to feedback pulse received from the decoding means, said stepping signals being derived from the consecutive leading edges or trailing edges of said feedback pulses;

switching means to cause the stepper phaser means to generate two consecutive stepping signals derived from the trailing edge of a first feedback signal and the leading edge of the next following feedback signal, thus varying the phase of the second of said two stepping signals with respect to the first of said signals;

high-speed delay means coupled to the stepper phaser means to cause the motor to step at a relatively high rate of speed;

low-speed delay means coupled to the stepper phaser means to cause the motor to step at a relatively low rate of speed;

selecting means associated with said switching means for selecting one of the two delay means;

counting means coupled to the stepper phaser means to require said stepping motor to stop only after traversing a predetermined number of steps or a multiple thereof;

first step means coupled to the stepper phaser means to initiate movement of the motor from a halted condition;

pulse injection means coupled to the stepper phase means to cause the lead angle of the motor to be increased during initiation of movement of the motor from a halted condition; and blanking means coupled to the stepper phaser means and capable of the deletion of feedback pulses which would otherwise be applied to the stepper phaser means, to reduce the lead angle.

* * * * *